US 6,609,824 B1

(12) United States Patent
Sato et al.

(10) Patent No.: US 6,609,824 B1
(45) Date of Patent: Aug. 26, 2003

(54) RADIATION THERMOMETER

(75) Inventors: Tetsuya Sato, Kyoto (JP); Hiroyuki Ota, Kyoto (JP)

(73) Assignee: Omron Corporation, Kyoto (JP)

( * ) Notice: Subject to any disclaimer, the term of this patent is extended or adjusted under 35 U.S.C. 154(b) by 32 days.

(21) Appl. No.: 09/597,690

(22) Filed: Jun. 19, 2000

(30) Foreign Application Priority Data

Jun. 18, 1999 (JP) .......................................... 11-173336

(51) Int. Cl.$^7$ ................................................. G01J 5/00
(52) U.S. Cl. ...................................... 374/132; 374/133
(58) Field of Search .............................. 374/132, 133, 374/129; 703/130–135; 600/549, 473, 474

(56) References Cited

U.S. PATENT DOCUMENTS

| RE34,507 E | * | 1/1994 | Egawa et al. ................ 374/132 |
| 6,102,564 A | * | 8/2000 | Egawa ........................ 374/132 |
| 6,155,712 A | * | 12/2000 | Egawa ........................ 374/133 |
| 6,186,959 B1 | * | 2/2001 | Canfield et al. ............. 600/559 |

* cited by examiner

Primary Examiner—Diego Gutierrez
Assistant Examiner—Yaritza Guadalupe
(74) Attorney, Agent, or Firm—Morrison & Foerster LLP

(57) ABSTRACT

A radiation thermometer capable of precise measurement without depending upon an absolute precision of an infrared ray sensor for detecting infrared ray or a temperature sensor for measuring a temperature of the infrared ray sensor is provided wherein, controlling means retains a reference temperature for the measurement object, a sensor reference temperature for the sensor, and a sensor reference output for the sensor output when infrared ray radiated from the object of measurement having the object of measurement reference temperature is detected by the infrared ray sensor having the sensor reference temperature, and calculates the temperature of measurement object based on a first difference as a difference between a sensor temperature to be measured by the sensor temperature measuring portion and a sensor reference temperature, a second difference as a difference between a sensor output to be detected by the infrared ray sensor and a sensor reference output and the object of measurement reference temperature.

9 Claims, 6 Drawing Sheets

RADIATION THERMOMETER

BACKGROUND OF THE INVENTION

1. Field of the Invention

This invention relates to a radiation thermometer for measuring the temperature of an object of measurement by infrared ray radiated from the object of measurement.

2. Description of the Related Art

As this type of radiation thermometer, a clinical thermometer for measuring with the method disclosed, for example, in the gazette of unexamined published Japanese Patent Application Laid-open No. Sho 61-117422 is known. The clinical thermometer comprises an infrared ray sensor, a probe for taking in infrared ray from an earhole, and a controller for maintaining a sensor temperature of an infrared sensor at a predetermined temperature, and calculates a temperature from an output of the infrared ray sensor and the sensor temperature of the infrared ray sensor maintained at a predetermined temperature. In addition, in another radiation thermometer similar to this type, it calculates a temperature from a measured sensor temperature of an infrared ray sensor and an output of an infrared sensor by measuring temperature of the infrared sensor (sensor temperature) in stead of maintaining it.

In such a radiation thermometer, a temperature of an object of measurement is calculated in accordance with the following logical expression (equation 1) derived from a rule generally known as the Rule of Stefan-Boltzmann (see, for example, "infrared radiation engineering: basics and applications" edited by Infrared Ray Technology Research Institute and published by Ohmsha, Ltd.):

$$\text{Output of infrared ray sensor } E = L(Tx^4 - Ta^4) \quad \text{Equation 1}$$

where, Tx is an absolute temperature of an object of measurement (an object of measurement temperature);

Ta is an absolute temperature of an infrared ray sensor (a sensor temperature);

E is an output of an infrared ray sensor (a sensor output); and

L is a coefficient indicating the sensitivity of a measurement system.

In the past, with such a radiation thermometer, a sensor temperature was preserved at a reference temperature Ta0, an object of measurement having a known object of measurement reference temperature T0 was measured, and a measurement value was adjusted in accordance with a logical expression such as equation 1 using a calculated sensor output E0. That is to say, during an adjustment, controlling means incorporated in the radiation thermometer determined a coefficient L that could be measured most precisely in accordance with the equation shown by the straight line 101 of FIG. 8 from the above (T0, Ta0, E0), and retained the coefficient in a readable memory from the controlling means. Then, at the time of measurement, the controlling means incorporated in the radiation thermometer read out the coefficient L from the memory and calculated the temperature of the object of measurement in accordance with equation 1 from a sensor output E and a sensor temperature Ta of the infrared ray sensor.

However, in the conventional art as described above, there is a problem that the logical relationship as in the above logical expression (equation 1) cannot necessarily be met depending upon characteristics of parts such as an infrared ray sensor forming a measurement apparatus. For example, the relationship of the above logical expression (equation 1) is shown by the straight line 101, but in an actual measurement, there emerges a gap between the straight line 101 and, for example, the dotted line 100 of FIG. 8.

Therefore, there is a problem that an occurrence of a measurement error cannot be ultimately avoided even if an absolute precision of a measurement value is aimed to be improved in accordance with the logical expression (equation 1) or the Rule of Stefan-Boltzmann, and that parts such as a sensor with high absolute precision are required for restraining such an error.

SUMMARY OF THE INVENTION

The present invention has been devised to solve the above mentioned object and it is an object of the present invention to provide a radiation thermometer capable of precise measurement without depending on an absolute precision of an infrared ray sensor for detecting infrared ray or a temperature sensor for measuring a temperature of the infrared ray sensor.

In order to attain the above object, a radiation thermometer of the present invention has the following configuration. A radiation thermometer of the present invention comprises an infrared ray sensor for detecting infrared ray radiated from an object of measurement as a sensor output, a sensor temperature measuring portion for measuring the temperature of the infrared ray sensor itself as a sensor temperature, a controlling means for calculating the temperature of the object of measurement as an object of measurement temperature based oh the sensor output and the sensor temperature, wherein the controlling means for controlling the temperature measurement retains information for an object of measurement reference temperature as an object of measurement temperature to be a reference, information for a sensor reference temperature as a sensor temperature to be a reference, and information for a sensor reference output as a sensor output to be a reference when infrared ray radiated from the object of measurement having the object of measurement reference temperature is detected by the infrared ray sensor having the sensor reference temperature, and calculates the object of measurement temperature of the object of measurement based on a first difference as a difference between a sensor temperature measured by the sensor temperature measuring portion and a sensor reference temperature calculated from the information for the sensor reference temperature, a second difference as a difference between a sensor output detected by the infrared ray sensor and a sensor reference output calculated from the information for a sensor reference output, and the information for an object of measurement reference temperature.

In this case, the controlling means may retain the variation characteristics of an object of measurement temperature specified by the combination of object of measurement temperatures at a plurality of points measured in advance, a sensor temperature and a sensor output, and calculate the object of measurement temperature based on the variation amount of the object of measurement temperature by the first difference, the variation amount of the object of measurement temperature by the second difference, and the information for an object of measurement reference temperature.

In addition, the controlling means may further retain sensor temperature dependent amount calculation information found based on the relationship between each sensor output at the time when the infrared ray sensor detects infrared ray from an object of measurement having a specific object of measurement temperature at different sensor temperatures at a plurality of points, respectively, and each sensor temperature at that time and sensor output dependent amount calculation information found based on the relationship between each sensor output at the time when the infrared ray sensor detects infrared ray from an object of measurement having different object of measurement temperatures of a plurality of points at a specific sensor temperature, respectively, and each object of measurement temperature at that time, and calculate the temperature of the object of measurement based on a relative sensor temperature dependent amount to be calculated based on the first difference and the sensor temperature dependent amount calculation information, a relative sensor output dependent amount calculated based on the second difference and the sensor output dependent amount calculation information, and information for the object of measurement reference temperature.

For this purpose, a sensor reference output at the time when an object of measurement to be a reference having an object of measurement reference temperature is measured by an infrared ray sensor placed under a sensor reference temperature is calculated first in advance. Then, when an object of measurement with an unknown object of measurement temperature is measured at a specific sensor temperature and a specific sensor output is found, the object of measurement temperature of the object of measurement is calculated based on each difference of the sensor temperature and the sensor output from the sensor reference temperature and the sensor reference output.

In this case, a variation amount for the sensor temperature, i.e., a relative sensor temperature dependent amount, may be calculated based on the difference of the sensor temperature from the sensor reference temperature, and a measurement temperature attributable to the sensor output may be calculated in accordance with the logical expression (equation 1).

In addition, a variation amount for the sensor output, i.e., a relative sensor output dependent amount, may be calculated based on the difference of the sensor output from the sensor reference output, and a measurement temperature attributable to the sensor temperature may be calculated in accordance with the logical expression (equation 1).

Further, the temperature measuring means may be equipped with a thermistor or a diode. Further, the infrared ray detecting means may be equipped with a thermopile or a pyroelectric sensor.

Moreover, the variation characteristics may be composed of a biquadratic or less polynominal of one or both of a sensor temperature value and a sensor output value, and the sensor temperature dependent amount calculation information may be represented by a coefficient composing a biquadratic or less polynominal of a sensor temperature value and the sensor output dependent amount calculation information may be represented by a coefficient composing a biquadratic or less polynominal of a sensor output value.

DETAILED DESCRIPTION OF THE PREFERRED EMBODIMENTS

Preferred embodiments of the present invention will now be described with reference to the attached drawings.

Embodiment 1
Configuration of a Radiation Thermometer

Figure 1:
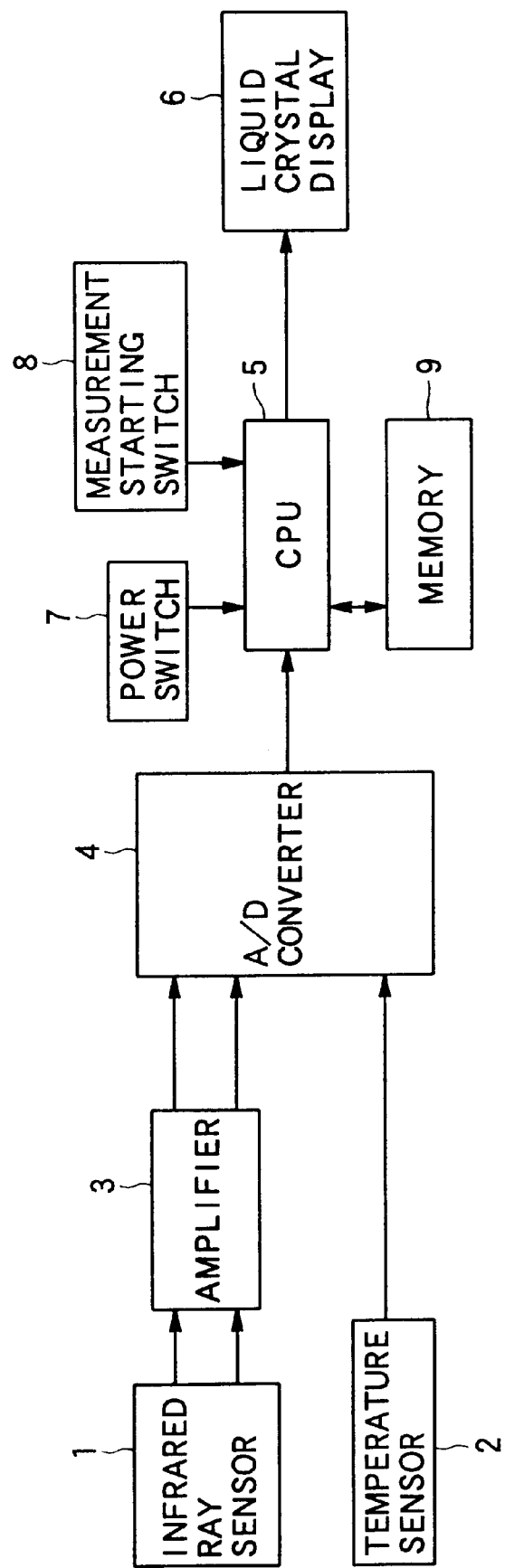
FIG. 1 is a block diagram showing a configuration of a radiation thermometer in accordance with an aspect of the present invention.
Figure 2:
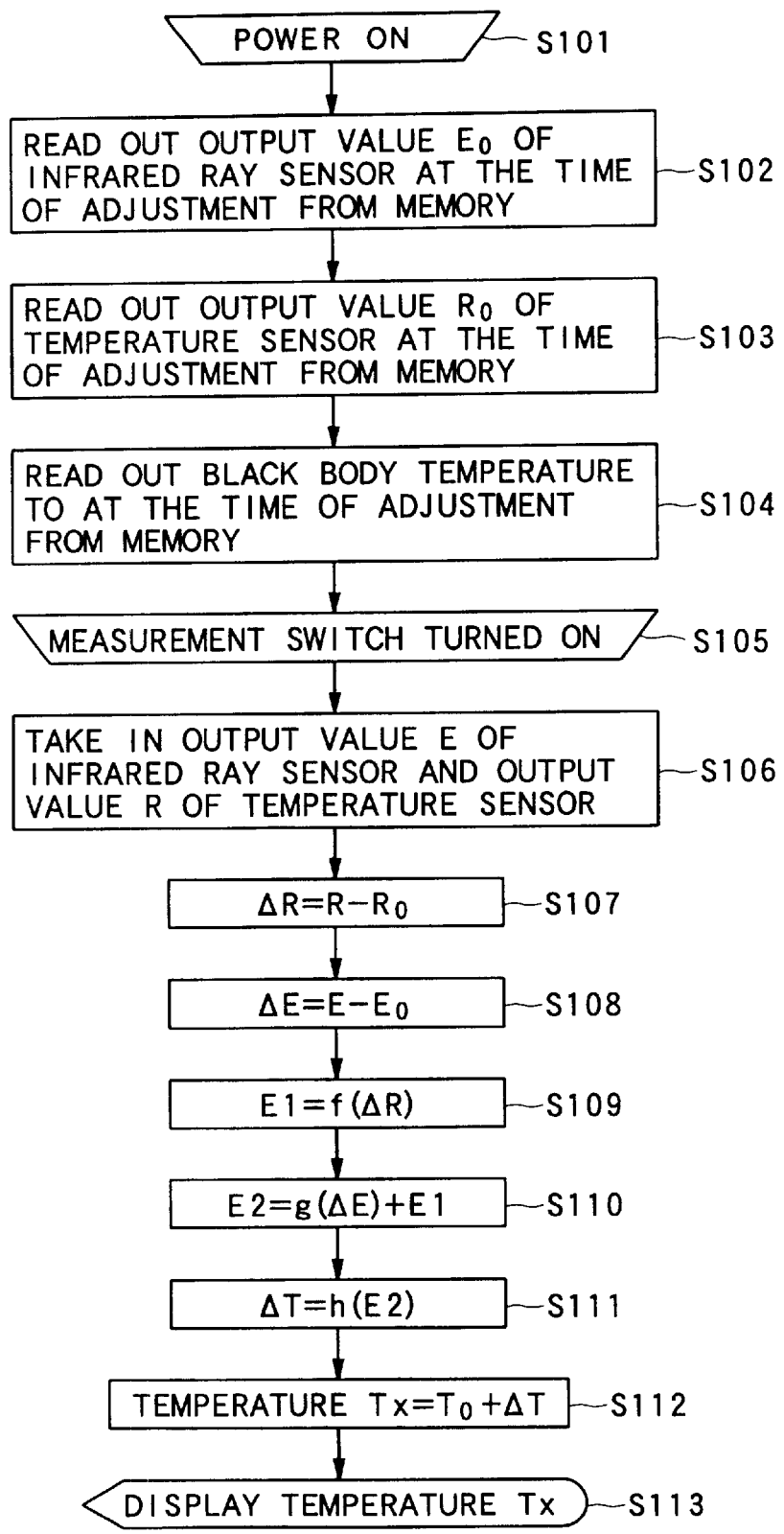
FIG. 2 is a flow chart showing an operation of a radiation thermometer in accordance with Embodiment 1 of the present invention.
Figure 5:
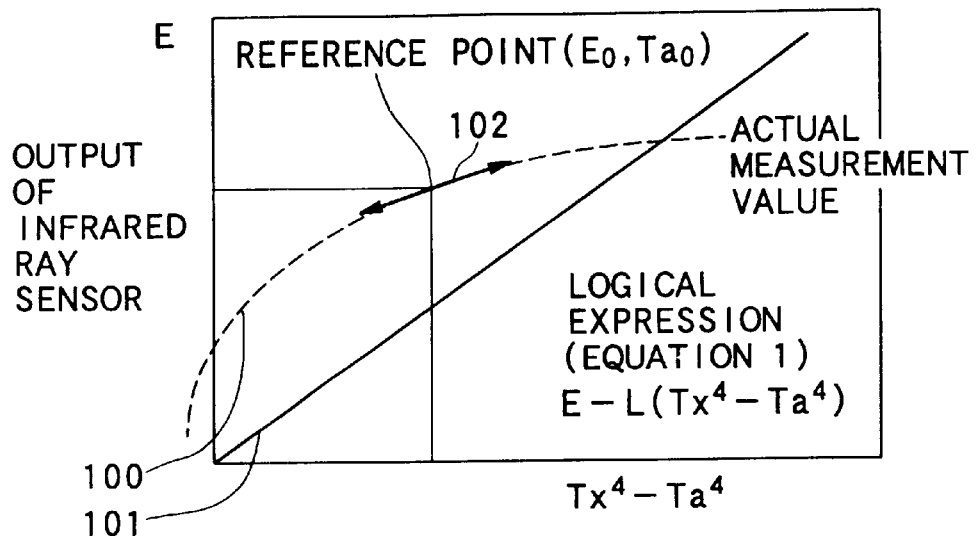
FIG. 5 is a graph showing a measurement principle of the present invention using a logical expression or an actual measured value of the detection characteristics of a radiation thermometer.
Figure 6:
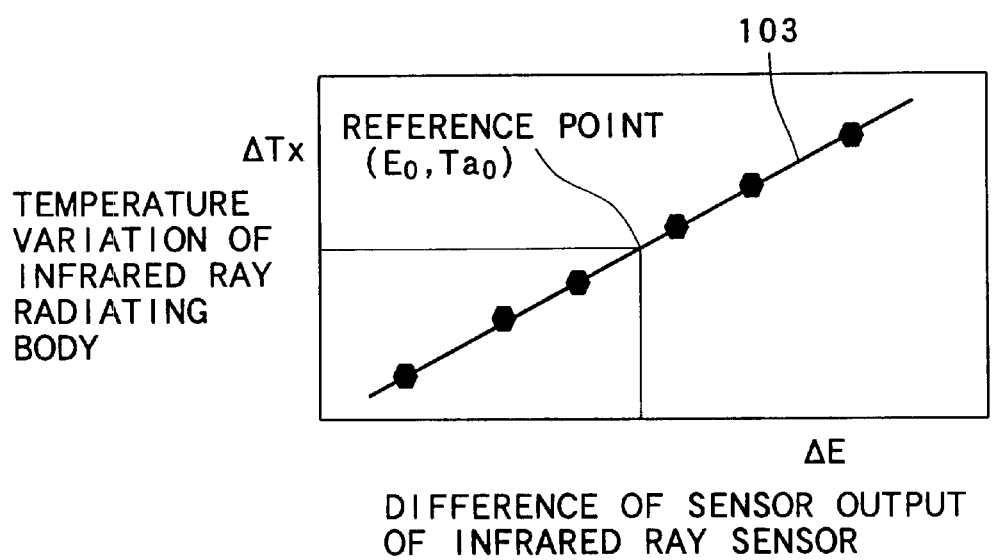
FIG. 6 is a graph showing an experimental equation of a sensor output dependent amount of an aspect of the present invention.
Figure 7:
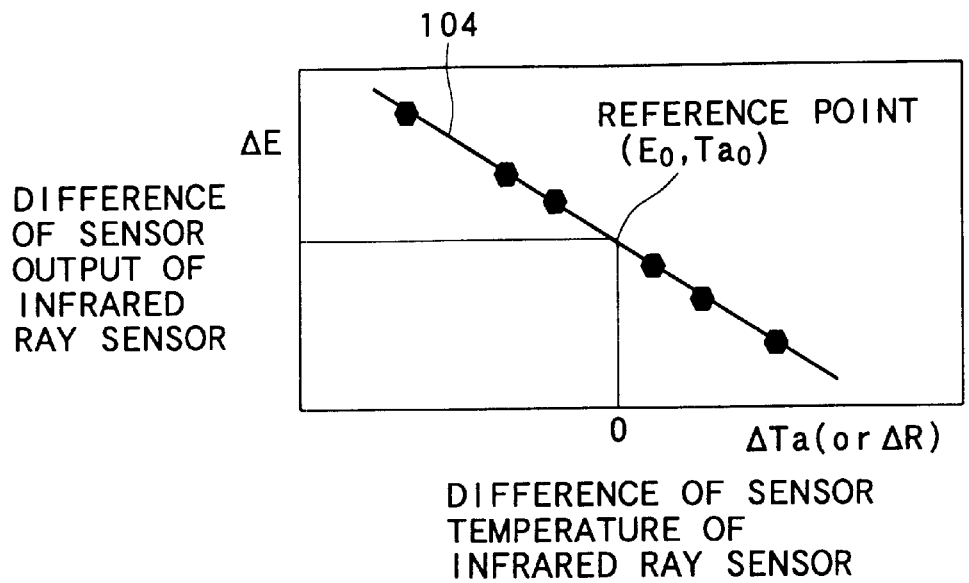
FIG. 7 is a graph showing an experimental equation of a sensor temperature dependent amount of an aspect of the present invention.
Figure 8:
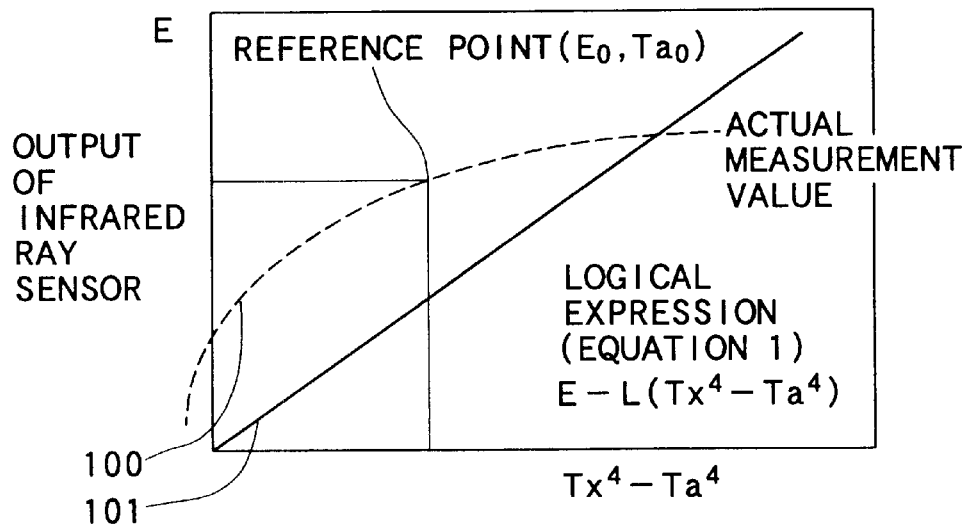
FIG. 8 is a graph showing a logical expression and an actual measured value of the detection characteristics of a radiation thermometer.

A radiation thermometer in accordance with Embodiment 1 of the present invention is described with reference to FIG. 1, FIG. 2 and FIGS. 5 through 7. FIG. 1 is a block diagram of a radiation thermometer in accordance with Embodiment 1 of the present invention, FIG. 2 is a flow chart showing its operation, FIG. 5 is a graph showing a measurement principle of the present invention, FIG. 6 is a graph showing the relationship between the detection characteristics and a sensor output of the radiation thermometer of this embodiment, and FIG. 7 is a graph showing the relationship between the detection characteristics and a sensor temperature of the radiation thermometer.

A block diagram showing the configuration of this radiation thermometer is shown in FIG. 1. This radiation thermometer is equipped with an infrared ray sensor 1 for detecting infrared ray radiated from an earhole, a temperature sensor 2 (corresponding a sensor temperature measuring portion) for measuring the temperature of the infrared ray sensor 1 itself (sensor temperature), a probe (not shown) to be inserted in an earhole for guiding infrared ray from the eardrum and its vicinity to the infrared ray sensor 1, an amplifier 3 for receiving and amplifying an output of the infrared ray sensor 1 (sensor output) and an A/D converter 4 for converting an output of the sensor 1 and an output of the temperature sensor 2 that have been amplified by the amplifier 3 to digital amounts. In addition, the radiation thermometer has a CPU 5 for controlling a measuring sequence and the above mentioned A/D converter 4, a power switch 7 for turning on or off a power source, a measurement starting switch 8 which instructs the start of measurement, a memory 9, and a liquid crystal display 6 are connected to the CPU 5.

In this embodiment, a thermopile is used as the infrared ray sensor 1. The infrared ray sensor 1 is disposed in the depth of the probe together with the temperature sensor 2. An output of the infrared ray sensor 1 is input in the amplifier 3 and amplified, converted to digital signals by the A/D converter 4, and taken in the CPU 5.

On the other hand, the temperature sensor 2 touches the infrared ray sensor 1 in order to measure the temperature of the infrared ray sensor 1. An output of the temperature sensor 2 is converted to digital signals by the A/D converter 4 as it is, and sent to the CPU 5. In this embodiment, a thermistor is used as the temperature sensor 2. Therefore, in this embodiment, the sensor temperature of the infrared ray sensor 1 measured by the temperature sensor 2 is shown as a resistance value R of the thermistor.

Processing by the CPU

Processing by the CPU 5 is hereinafter described in detail.

The CPU 5 calculates (as corresponding to a controlling means) the temperature Tx of an object of measurement from the output E of the infrared ray sensor 1 and the output Ta of the temperature sensor 2 (or the resistance value R of the thermistor) by the execution of a control program stored in the memory 9. The temperature corresponds to the object of measurement temperature.

In this case, it is necessary to measure the temperature of an object of measurement whose temperature is to be a known reference in advance, and adjust a measurement temperature calculated by the CPU 5. It is now assumed that the temperature sensor 2 is maintained at the sensor reference temperature Ta0 (the output of the temperature sensor 2 at that time is the reference resistance R0) and the sensor reference output E0 of the infrared ray sensor 1 when the temperature of an object of measurement having the known reference temperature T0 (object of measurement reference temperature) is found. In addition, this (T0, E0, Ta0) is deemed to be called an adjustment point, and (E0, Ta0) excluding the object of measurement reference temperature T0 a reference point.

In the past, as described above, a measurement value was adjusted in accordance with a logical expression such as equation 1 using these data of the adjustment point (T0, E0, Ta0).

On the other hand, in this embodiment, the CPU 5 calculates the difference ΔE of the sensor output E with respect to the sensor reference output E0 and the difference ΔTa (the difference ΔR of the resistance value of the temperature sensor 2) of the sensor temperature with respect to the sensor reference temperature Ta0 (the output R0 of the temperature sensor 2), and relatively calculates the object of measurement temperature Tx from the differences. This corresponds to calculating the object of measurement temperature Tx of an object of measurement by the displacement indicated by an arrow 102 in the area indicated by the above difference in the vicinity of the reference point (E0, Ta0) on the graph of the detection characteristics of the actually measured radiation thermometer indicated by a dotted line 100 shown in FIG. 5 (this is hereinafter referred to as the variation characteristics).

That is to say, the present invention provides a radiation thermometer for measuring the temperature of an object of measurement in accordance with the below equation 2 instead of the conventional equation 1.

$$\text{Temperature } Tx = T0 + f(\Delta Ta) + g(\Delta E) \quad \text{Equation 2}$$

where, T0 is an object of measurement reference temperature of an object of measurement;

ΔTa is a difference from the sensor reference temperature of the sensor temperature of the infrared ray sensor 1. However, when a temperature measuring resistant material such as a thermistor is used as the temperature sensor 2, the sensor temperature is generally given as its resistance value R, and the difference of the sensor temperature is given as the difference ΔR of the resistance value R from the reference resistance value R0;

ΔE is a difference of the sensor output of the infrared ray sensor 1 from the sensor reference output;

f is a function indicating contribution to the measured temperature when the sensor temperature is changed (corresponding to the sensor temperature dependent amount calculation information) Infrared ray from an object of measurement to be a reference having a specific temperature can be experimentally calculated based on the relationship between the sensor output of the infrared ray sensor 1 at the time when it is detected at different sensor temperatures of a plurality of points and the sensor temperature at that time;

f(ΔTa) is a relative sensor temperature dependent amount. However, when a temperature measuring resistant material such as a thermistor is used as the temperature sensor 2, this can be equivalently represented as f(ΔR);

g is a contribution to the measured temperature when the sensor output is changed (corresponding to the sensor output dependent amount calculation information). Infrared ray from a measurement object to be a reference at different object of measurement temperatures at a plurality of points can be experimentally calculated based on the relationship between the sensor output of the infrared ray sensor 1 at the time when it is detected at a specific sensor temperature and the object of measurement temperature at that time; and g(ΔE) is a relative sensor output dependent amount.

Since a thermistor is used as the temperature sensor 2, its output is found as a resistance value. Equation 3 is shown below, in which the sensor temperature Ta of equation 2 is rewritten as the output resistance R of the thermistor being the temperature sensor 2. A radiation thermometer in accordance with this embodiment measures a temperature in accordance with this equation 3.

$$\text{Temperature } Tx = T(R0, E0) + f(\Delta R) + g(\Delta E) \quad \text{Equation 3}$$
$$= T0 + f(\Delta R) + g(\Delta E)$$

Due to this, in this embodiment, the variation characteristics as shown in FIG. 6 and FIG. 7 is found for each radiation thermometer that is an object of adjustment by fixing one of the sensor output E and the sensor temperature Ta (the output R of the temperature sensor 2) at the reference-point (E0, Ta0), and by changing the other and measuring the temperature of an object of measurement whose temperature is known.

First, the known reference temperature of an object of measurement is represented by T0 (the object of measurement reference temperature), and the output when T0 is measured at the sensor reference temperature Ta0 (the output of the temperature sensor 2 is the reference resistance value R0) is represented by E0 (the sensor reference output).

Then, the sensor temperature is fixed at the sensor reference temperature Ta0 (the output of the temperature sensor 2 is the reference resistance value R0), the temperature Tx of the object of measurement is changed and the variation amount of the variation ΔE of the sensor output at that time is measured and plotted as shown in FIG. 6. The graph of FIG. 6 measured in this way shows the contribution ΔTx= g(ΔE) to the measured temperature when the difference ΔE from the sensor reference output E0 of the output E of the infrared ray sensor 1 being the quadrature axis is found. This corresponds to the sensor output dependent amount. In addition, since the function g to be found as an experimental equation of the graph shown in FIG. 6 has variation characteristics dependent on the sensor output, it corresponds to the sensor output dependent amount calculation information.

On the other hand, the temperature of an object of measurement is fixed at the object of measurement reference temperature T0, the sensor temperature Ta (the output of the temperature sensor 2 to be detected at this time is the resistance R) is changed and the variation amount of the variation ΔE of the sensor output at that time is measured and plotted as shown in FIG. 7. The graph of FIG. 7 measured in this way shows the contribution ΔE=f(ΔR) to the sensor output when the difference ΔR from the reference resistance value R0 (output of temperature sensor 2 of sensor reference temperature Ta0) of the output R of the temperature sensor 2 being the quadrature axis is found. Further, since the axis of ordinates represents the contribution ΔE to the sensor output in FIG. 7, it is necessary to convert the unit to a temperature when the contribution to the measured temperature is found. Since this function f is the variation characteristics that is dependent upon the sensor temperature, it corresponds to the sensor temperature dependent amount calculation information.

The experimental equation shown in FIG. 6 or FIG. 7 can be found with a linear or quadric expression or more advanced polynominal and the like by collecting experimental values as described above, and using such method as the minimum square method. However, considering the load on the CPU 5 due to the complexity of calculation, a biquadratic or less polynominal is preferred. These experimental equations show the detection characteristics of the temperature measurement each radiation thermometer has, but since it is calculated as a relative value from the reference point (E0, Ta0), it is called "variation characteristics".

At the time of adjustment of a radiation thermometer, the CPU 5 retains a coefficient defining the variation characteristics found in this way in the memory 9 (A coefficient of the variation characteristics to be found from FIG. 6 is the sensor output dependent amount calculation information and a coefficient of the variation characteristics to be found from FIG. 7 whose unit is converted to the measured temperature corresponds to the sensor temperature dependent amount calculation information).

At the measurement step of the measurement object, the CPU 5 first calculates relative values of the sensor output E of the infrared ray sensor 1 and the output R of the temperature sensor 2 from the reference point (E0, R0). Then, the CPU 5 calculates a sensor output dependent amount and a sensor temperature dependent amount that are variation amounts to the object of measurement reference temperature T0 used as a reference from the sensor output dependent amount calculation information and the sensor temperature dependent amount calculation information retained in the memory 9, and can calculate the object of measurement temperature Tx of an object of measurement.

Example of Operation of a Radiation Thermometer

An example of overall operation of a radiation thermometer configured as above is next described using the flow chart of FIG. 2.

First, when the power switch 1 is turned on (step 101, hereinafter abbreviated as S101), the CPU 5 reads out the sensor reference output E0 of the infrared ray sensor 1 at the time of adjustment from the memory 9 (S102). The CPU 5 then reads out the output (reference resistance value) R0 of the temperature sensor 2 at the sensor reference temperature Ta0 from the memory 9 (S103). Further, the CPU 5 reads out the object of measurement reference temperature T0 at the time of adjustment from the memory 9 (S104).

In this state, a probe (not shown) of the radiation thermometer is inserted into an earhole and the measurement switch 8 is pressed to start the measurement (S105), and the CPU 5 takes in the output E of the infrared ray sensor 1 and the output R of the temperature sensor 2 through the A/D converter 4 (S106).

The CPU 5 then calculates the difference ΔR from the reference resistance value R0 of the output R of the temperature sensor 2 (S107). The CPU 5 then calculates the difference ΔE from the sensor reference output E0 of the output E of the infrared ray sensor 1 (S108). The CPU 5 then finds the sensor temperature dependent amount E1=f (ΔR) from the difference ΔR of the output of the temperature sensor 2 in accordance with the experimental equation found from the result of FIG. 7 (S109). The CPU 5 further finds the sensor output dependent amount g (ΔE) from the difference ΔE of the output of the infrared ray sensor 1 and adds it to the sensor temperature dependent amount E1 by the temperature sensor 2 to designate it as E2 (S110), finds the measurement temperature variation amount ΔT by converting the unit of E2 being the added result of the sensor temperature dependent amount and the sensor output dependent amount to temperature (S111), and finds the temperature Tx of an object of measurement by adding the found relative variation amount ΔT of the object of measurement temperature to the object of measurement reference temperature T0 (S112).

As described above, since the temperature of an object of measurement is measured as a relative amount from the object of measurement reference temperature T0 at the time of adjustment, it becomes possible to lessen the influence of the absolute precision of the infrared ray sensor 1 and the temperature sensor 2 and a radiation thermometer with high precision that is stable without depending upon the characteristics of each sensor can be provided. This is for finding a relative variation amount from the reference point (E0, Ta0) (corresponding to the arrow 102 of FIG. 5) on the actually measured variation characteristics (the dotted line graph 100 of FIG. 5, the straight line 103 of FIG. 6 and the straight line 104 of FIG. 7) in FIG. 5 through FIG. 7. Therefore, comparing with the case where it is found by the straight line 101 of FIG. 5 indicated by the logical expression (equation 1), both of the detection sensitivity corresponding to the coefficient L and the gap of the E axis at the origin are precisely adjustable.

Examples of Modification

Although the difference ΔR of the output of the temperature sensor is once converted to the output variation E1 of the infrared ray sensor when the relative variation amount ΔT of the temperature of an object of measurement is found in this embodiment, this is only an example for converting a unit and the present invention is not limited to this processing. For example, the temperature Tx can be found by directly converting the unit of the difference ΔE of the output of the infrared ray sensor 1 and the difference ΔR of the output of the temperature sensor 2 to the relative temperature variation of an object of measurement and adding each of them to the object of measurement reference temperature T0 (method of calculation as in equation 3).

That is to say, the present invention is not limited by the order of unit conversion, but may ultimately find the relative variation amount to the object of measurement reference temperature T0 by adding the contribution by the difference ΔE of the output of the infrared ray sensor 1 and the contribution by the difference ΔR of the output of the temperature sensor 2 after making each unit identical.

In addition, although only one point is used as data of the adjustment point (T0, E0, Ta0) in the above embodiment, data at a plurality of adjustment points may be stored in the memory 9 and selected to be used in accordance with an object of measurement, or combined to data of a plurality of adjustment points (T0, E0, Ta0).

Further, although a thermopile is used as the infrared ray sensor 1 in this embodiment, a pyroelectric sensor may be used.

Moreover, although a thermistor is used as the temperature sensor 2 in this embodiment, the temperature sensor 2 of the present invention is not limited to a thermistor but may use other temperature measuring resistant materials (metal materials with known temperature coefficient of resistance), a semiconductor sensor such as a diode, or a thermocouple.

Furthermore, although the temperature sensor 2 is directly converted by the A/D converter 4 in this embodiment, it may be amplified by an amplifier in advance when the output of the temperature sensor 2 is weak.

Embodiment 1 applies the present invention to a thermometer with a probe as an element, but the implementation of the present invention is not limited to this. For example, the present invention can be implemented in the measurement of a temperature other than a human body temperature, in such cases as the measurement of geothermal temperature or the measurement of temperature based on infrared ray radiation from a specific object of measurement under exposure to the atmosphere. In short, the present invention is not limited to a physical configuration for each sensor to detect a signal, but has a feature in the operation for processing a signal taken from each sensor.

Embodiment 2

A radiation thermometer of Embodiment 1 finds differences from a reference value for outputs from both of the infrared ray sensor 1 and the temperature sensor 2, and calculates a sensor temperature dependent amount and a sensor output dependent amount for the object of measurement reference temperature T0 based on these differences to find the temperature of an object of measurement.

On the other hand, in accordance with the present invention, only one of the sensor temperature and the sensor output may be found with a variation amount from the above mentioned reference value and the other may be found by the conventional measurement. That is to say, the temperature of an object of measurement may be measured based on a relative sensor temperature dependent amount calculated by the sensor temperature dependent amount calculation information from the difference of a sensor temperature measured by the sensor temperature measuring portion from the sensor reference temperature when an object of measurement is measured, and the sensor output of the infrared ray sensor 1.

This relationship is indicated by the following equation 4.

$$\begin{aligned} \text{Temperature } Tx &= T(Ta, E) \\ &= T(Ta0, E) + f(\Delta Ta, E) \\ &\approx T(Ta0, E) + f(\Delta Ta, E0) \end{aligned} \quad \text{Equation 4}$$

where, T(Ta, E) is an equation for finding the temperature of an object of measurement pursuant to the Rule of Stefan-Boltzmann. For example, when equation 1 is used as a logical expression, $T(Ta, E) = (E/L + Ta^4)^{1/4}$;

Ta0 is a sensor reference temperature of the infrared ray sensor 1;

ΔTa is a difference from the sensor reference temperature of the sensor temperature of the infrared ray sensor; and f(ΔTa, E) is a relative sensor temperature dependent amount.

Since f(ΔTa, E0) with the sensor output E fixed at E0 can be used when the function f is not largely dependent upon E, infrared ray from an object of measurement to be a reference having a specific temperature can be experimentally found based on the relationship between the sensor output of the infrared ray sensor 1 when detected at different sensor temperatures at a plurality of points and its sensor temperature.

In addition, equation 5 in which the sensor temperature Ta in the above equation 4 is rewritten as the output R of the thermistor being the temperature sensor 2 is shown below. A radiation thermometer of this embodiment is for calculating a temperature in accordance with this equation 5 with the CPU 5 executing a control program. Further, the relative sensor temperature dependent amount f(ΔR, E0) is represented by "f(ΔR)".

$$\text{Temperature } Tx \approx T(R0, E) + f(\Delta R)" \quad \text{Equation 5}$$

Embodiment 2 has the identical configuration and operation other than a control program to be executed by the CPU 5 with Embodiment 1 and is described if necessary using FIG. 1. In addition, in this embodiment as well, it is assumed that the temperature sensor 2 has measured an object of measurement of the object of measurement reference temperature T0 and found the sensor reference output E0 of the infrared ray sensor 1 at the sensor reference temperature Ta0(at this time, the output of the temperature sensor 2 is the reference resistance value R0).

Figure 3:
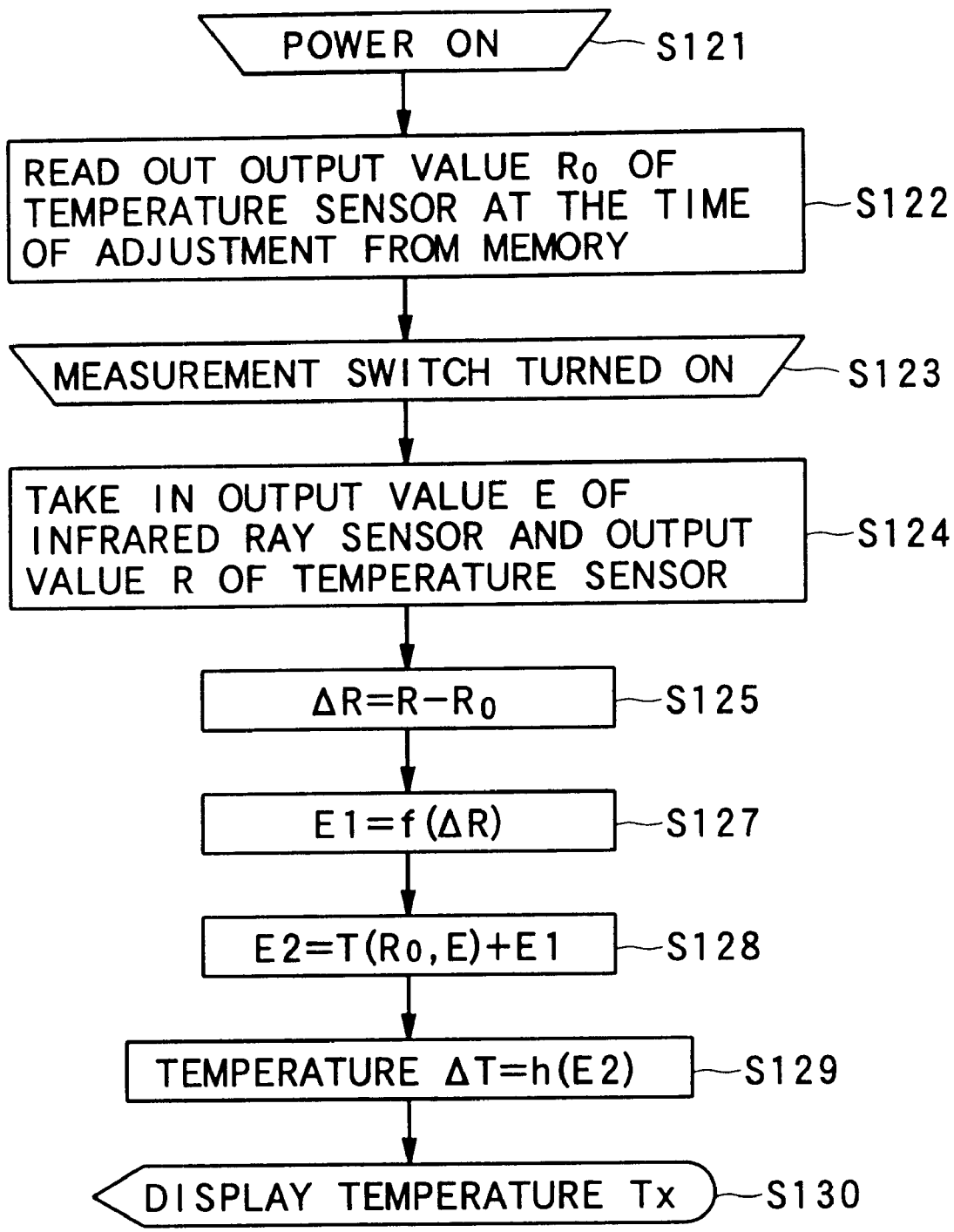
FIG. 3 is a flow chart showing an operation of Embodiment 2 of the present invention.

FIG. 3 is a flow chart showing Embodiment 2 of the present invention. In a radiation thermometer of the flow chart shown in FIG. 3 as in Embodiment 1, when the power switch 1 is turned on (S121), the CPU 5 reads out the output R0 of the temperature sensor 2 at the time of adjustment from the memory (S122).

In this state, when a probe (not shown) of the radiation thermometer is inserted into an earhole, the measurement switch 8 is pressed to start the measurement (S123). First, the CPU 5 takes in the output E of the infrared ray sensor 1 and the output R of the temperature sensor 2 through the A/D converter 4 (S124).

Then, the CPU 5 calculates the difference ΔR from the reference resistance value R0 of the output R of the temperature sensor 2 (S125). Further, the CPU 5 finds the sensor temperature dependent amount E1=f(ΔR) from the difference ΔR of the output of the temperature sensor 2 using the variation characteristics (corresponding to the sensor temperature dependent amount calculation information) found from the result of FIG. 7 (S127), further finds T (R0, E) from the output E of the infrared ray sensor 1, and finds the measurement amount E2 by adding the above mentioned sensor temperature dependent amount E1 (S128), and finds the temperature Tx of an object of measurement by converting E2 to a temperature.

Embodiment 3

A radiation thermometer of the above Embodiment 2 is for finding the sensor temperature dependent amount from the difference of the output R of the temperature sensor 2 from the reference resistance value R0 and measuring the temperature of an object of measurement by the sensor temperature dependent amount and the sensor output E of the infrared ray sensor 1. On the other hand, the temperature of an object of measurement may be measured based on the relative sensor output dependent amount calculated based on the sensor output dependent amount calculation information from the difference of the sensor output to be detected by the infrared ray sensor 1 at the time of measuring an object of measurement in accordance with the sensor reference output and the sensor temperature measured by the sensor temperature measuring portion.

This relationship is indicated by the following equation 6.

$$\text{Temperature } Tx = T(Ta, E) \quad \text{Equation 6}$$
$$= T(Ta, E0) + g(Ta, \Delta E)$$
$$\approx T(Ta, E0) + g(Ta0, \Delta E)$$

where, E0 is a sensor reference output of the infrared ray sensor 1;

ΔE is a difference of the sensor output from the sensor reference output;

g(Ta, ΔE) is a relative sensor output dependent amount. Since g (Ta0, ΔE) with the sensor temperature Ta fixed at Ta0 can be used when the function g is not largely dependent upon Ta, infrared ray from an object of measurement to be a reference at different object of measurement temperatures at a plurality of points can be experimentally found based on the relationship between the sensor output of the infrared ray sensor 1 when detected at a specific sensor temperature and the object of measurement temperature at that time.

In addition, equation 7 in which the sensor temperature Ta in the above equation 6 is rewritten as the output R of the thermistor being the temperature sensor 2 is shown below (further Ta0 is rewritten as R0). With a radiation thermometer of this embodiment, the CPU 5 executes a control program and calculates a temperature in accordance with this equation 7. However, g(R0, ΔE) is represented by "g(ΔE)".

$$\text{Temperature } Tx \approx T(R, E0) + g(\Delta E)" \quad \text{Equation 7}$$

Embodiment 2 has the identical configuration and operation other than a control program to be executed by the CPU 5 with the Embodiment 1 and is described using FIG. 1 if necessary. In addition, in this embodiment as well, it is assumed that the temperature sensor 2 has measured an object of measurement of the object of measurement reference temperature T0 and found the sensor reference output E0 of the infrared ray sensor 1 at the sensor reference temperature Ta0(at this time, the output of the temperature sensor 2 is the reference resistance value R0).

Figure 4:
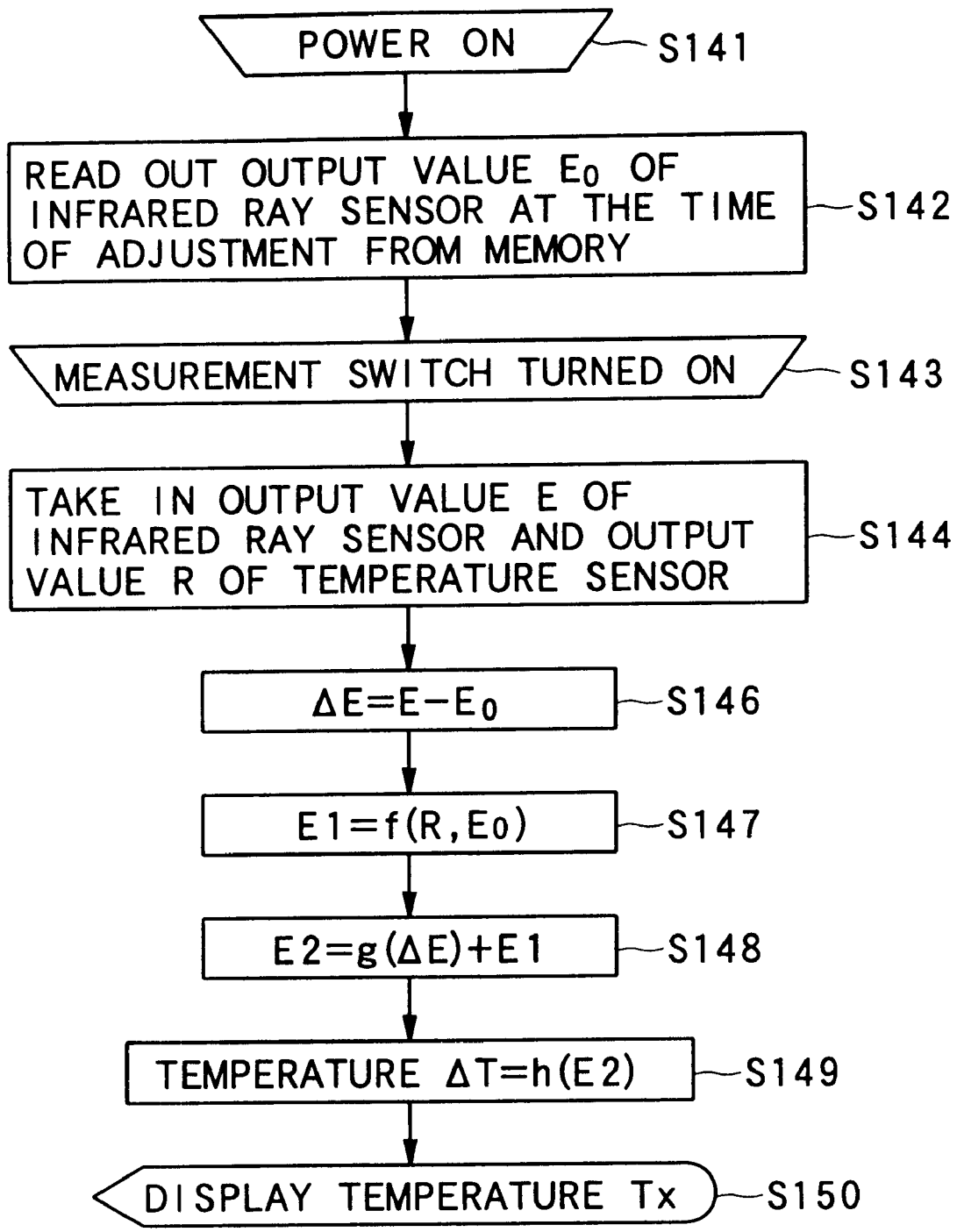
FIG. 4 is a flow chart showing an operation of Embodiment 3 of the present invention.

FIG. 4 is a flow chart showing Embodiment 3 of the present invention. In a radiation thermometer of the flow chart shown in FIG. 4, similar to Embodiment 1, when the power switch 1 is turned on (S141), the CPU 5 reads out the sensor reference output E0 of the infrared ray sensor 1 at the time of adjustment from the memory 9 (S142).

In this state, when a probe of the radiation thermometer is inserted into an earhole and the measurement switch 8 is pressed, measurement is started (S143). First, the CPU 5 takes in the output E of the infrared ray sensor 1 and the output R of the temperature sensor 2 through the A/D converter 4 (S144).

Then, the CPU calculates the difference ΔE of the output E of the infrared ray sensor 1 from the sensor reference output E0 (S146). The CPU then finds E1=T(R,E0) from the output R of the temperature sensor 2 (S147). The CPU further finds the sensor output dependent amount g(ΔE) from the difference ΔE of the output of the infrared ray sensor 1 using the variation characteristics (corresponding to the sensor output dependent amount calculation information) found from the result of FIG. 6, and finds E2 by adding it to E1 (S148), finds the temperature Tx by converting E2 to a temperature (S149) and displays the finally found temperature on a liquid crystal display (S150).

As described above, since a radiation thermometer in accordance with the present invention does not rely on the improvement of the absolute precision based on a logical expression but measures the variation amount from a reference point and calculates a relative temperature based on the variation amount, precise measurement becomes possible without depending on the absolute precision of an infrared ray sensor or a temperature sensor.

Thus, it is seen that a radiation thermometer is provided. One skilled in the art will appreciate that the present invention can be practiced by other than the preferred embodiments which are presented for the purposes of illustration and not of limitation, and the present invention is limited only by the claims which follow.

What is claimed is:

1. A radiation thermometer comprising:
   an infrared ray sensor for detecting infrared radiation radiated from a measurement object and providing a sensor output;
   a sensor temperature measuring portion for measuring the temperature of said infrared ray sensor, the temperature corresponding to a sensor temperature; and
   means for calculating the temperature of the measurement object based on said sensor output and said sensor temperature,
   wherein said means for calculating the temperature of the measurement object retains a reference temperature for the measurement object, a sensor reference temperature for the sensor, and a sensor reference output for the sensor output when infrared radiation from said measurement object is detected by said infrared ray sensor, and calculates the temperature of the measurement object based on a first difference, which is a difference between the sensor temperature and the sensor reference temperature, a second difference, which is a difference between the sensor output detected by said infrared ray sensor and the sensor reference output, and the reference temperature for the measurement object.

2. A radiation thermometer in accordance with claim 1, wherein said means for calculating the temperature of the measurement object retains variation characteristics of a measurement object temperature determined by a combination of a measurement object temperature, a sensor temperature, and a sensor output all at a plurality of points measured in advance, and calculates said measurement object temperature based on the variation amount of a measurement object temperature by said first difference, by said second difference and the reference temperature for the measurement object.

3. A radiation thermometer in accordance with claim 1, wherein said means for calculating the temperature of the measurement object retains sensor temperature dependent amount calculation information determined by a relationship between the sensor output at the time when said infrared ray sensor detects infrared radiation from a measurement object having a specific temperature at different sensor temperatures at a plurality of points, respectively, and each sensor temperature, at that time, and sensor output dependent amount calculation information determined by a relationship between each sensor output at the time when said infrared ray sensor detects infrared radiation from a measurement object having different temperatures at a plurality of points at a specific sensor temperature, respectively, and each temperature at that time, wherein the temperature of the measurement object is calculated based on a relative sensor temperature dependent amount determine by said first difference and said sensor temperature dependent amount calculation information, a relative sensor output dependent amount determined by said second difference and said sensor output dependent amount calculation information, and the reference temperature for said measurement object.

4. A radiation thermometer comprising:
   an infrared ray sensor for detecting infrared radiation radiated from a measurement object and providing a sensor output;
   a sensor temperature measuring portion for measuring the temperature of said infrared ray sensor, the temperature corresponding to a sensor temperature; and
   means for calculating the temperature of the measurement object based on said sensor output and said sensor temperature,
   wherein said means for calculating the temperature of the measurement object retains a sensor reference temperature for the sensor, and calculates the measurement object temperature based on a difference between the sensor temperature and the sensor reference temperature, and the sensor output detected by said infrared ray sensor.

5. A radiation temperature in accordance with claim 4, wherein said means for calculating the temperature of the measurement object retains variation characteristics of a measurement object temperature specified by a combination of the measurement object temperature, a sensor temperature, and a sensor output all at a plurality of points measured in advance, and calculates said measurement object temperature based on the variation amount of said measurement object temperature by said difference between the sensor temperature and the sensor reference temperature, and a sensor output detected by said infrared ray sensor.

6. A radiation thermometer in accordance with claim 4, wherein said means for measuring the temperature of the measurement object further retains sensor temperature dependent amount calculation information found based on a relationship between each sensor output at the time when said infrared ray sensor detects infrared radiation from a measurement object having a specific temperature at different sensor temperatures at a plurality of points, respectively, and each sensor temperature at that time, wherein said measurement object temperature is calculated based on a relative sensor temperature dependent amount determined by the difference between the sensor temperature and the sensor reference temperature and said sensor temperature dependent amount calculation information, and a sensor output detected by said infrared ray sensor.

7. A radiation thermometer comprising:
   an infrared ray sensor for detecting infrared radiation radiated from a measurement object and providing a sensor output;
   a sensor temperature measuring portion for measuring the temperature of said infrared ray sensor, the temperature corresponding to a sensor temperature; and
   means for calculating the temperature of a measurement object based on said sensor output and said sensor temperature,
   wherein said means for calculating the temperature of a measurement object retains a reference temperature for a sensor reference output to be a reference at a time when infrared radiation radiated from a measurement object is detected by an infrared ray sensor, and the temperature of the measurement object is based on the difference between the sensor output detected by said infrared ray sensor and the sensor reference output, and a sensor temperature measured by said sensor temperature measuring portion.

8. A radiation thermometer in accordance with claim 7, wherein said means for calculating the temperature of a measurement object retains variation characteristics of the measurement object temperature specified by a combination of a measurement object temperature, a sensor temperature and a sensor output all at a plurality of points measured in advance, and the temperature of the measurement object is based on the variation amount of said measurement object temperature by said difference between the sensor output detected by said infrared ray sensor and the sensor reference output, and a sensor temperature measured by said sensor temperature measuring portion.

9. A radiation thermometer in accordance with claim 7, wherein said means for calculating the temperature of a measurement object retains sensor output dependent amount calculation information found based on the relationship between each sensor output at the time when said infrared ray sensor detects infrared radiation from a measurement object having different measurement object temperatures at a plurality of points at a specific sensor temperature, respectively, and each measurement object temperature at that time, and said measurement object temperature is calculated based on a relative sensor output dependent amount determined by the difference between the sensor output detected by said infrared ray sensor and the sensor reference output and said sensor output dependent amount calculation information, and a sensor temperature measured by said sensor temperature measuring portion.

* * * * *